(12) United States Patent
Huang

(10) Patent No.: US 11,824,427 B2
(45) Date of Patent: Nov. 21, 2023

(54) CANNED MOTOR DEVICE

(71) Applicant: Zi Yi Electrical Engineering Co., LTD., Taichung (TW)

(72) Inventor: Ting-Tsai Huang, Taichung (TW)

(73) Assignee: Zi Yi Electrical Engineering Co., LTD, Taichung (TW)

( * ) Notice: Subject to any disclaimer, the term of this patent is extended or adjusted under 35 U.S.C. 154(b) by 433 days.

(21) Appl. No.: 17/239,518

(22) Filed: Apr. 23, 2021

(65) Prior Publication Data
US 2021/0351665 A1    Nov. 11, 2021

Related U.S. Application Data

(63) Continuation-in-part of application No. 16/997,006, filed on Aug. 19, 2020, now abandoned.

(30) Foreign Application Priority Data

May 11, 2020  (TW) ................................ 109115527
May 11, 2020  (TW) ................................ 109205664

(51) Int. Cl.
*H02K 9/197*    (2006.01)
*H02K 9/193*    (2006.01)
*H02K 5/128*    (2006.01)

(52) U.S. Cl.
CPC ............. *H02K 9/197* (2013.01); *H02K 5/128* (2013.01); *H02K 9/193* (2013.01)

(58) Field of Classification Search
CPC ......... H02K 5/128; H02K 9/193; H02K 9/197
See application file for complete search history.

(56) References Cited

U.S. PATENT DOCUMENTS

| | | | | |
|---|---|---|---|---|
| 8,601,686 | B2* | 12/2013 | Matsunaga | F04D 13/0633 29/888.02 |
| 2004/0184936 | A1* | 9/2004 | Yanagihara | F04D 29/026 417/420 |
| 2007/0237660 | A1* | 10/2007 | Akiyoshi | F04D 13/0626 310/86 |
| 2008/0038126 | A1* | 2/2008 | Berroth | F04D 25/026 415/60 |
| 2013/0038151 | A1* | 2/2013 | Ohashi | H02K 7/086 310/59 |
| 2017/0302124 | A1* | 10/2017 | Ehrsam | F04D 29/5813 |

FOREIGN PATENT DOCUMENTS

TW    I424661 B    1/2014

* cited by examiner

*Primary Examiner* — Jue Zhang
(74) *Attorney, Agent, or Firm* — Quinn IP Law

(57) ABSTRACT

A canned motor device includes a base unit, a motor, and front and rear covers. The base unit includes a side surface including inner and outer annular segments. The motor is mounted in the base unit and includes a flange. The rear cover is mounted in the base unit and includes a disk clamped sealingly between the flange and the inner annular segment. The front cover has an end abutting against the side surface and includes inner and outer surrounding segments. The disk and flange are clamped sealingly between the inner annular and surrounding segments. A first sealing element is disposed between the base unit and the disk. A second sealing element is disposed between the outer annular segment and the outer surrounding segment to form an airtight seal between the base unit and the front cover.

9 Claims, 3 Drawing Sheets

CANNED MOTOR DEVICE

FIELD

The disclosure relates to a motor device, and more particularly to a canned motor device capable of preventing leakage.

BACKGROUND

A conventional magnetically driven canned motor device disclosed in Taiwanese Patent No. 1424661 includes a front cover, a support frame, an impeller, a cup-shaped rear cover, an inner rotor, an outer rotor, a fixed shaft and a bracket. The front cover has an inlet and an outlet. The rear cover is a double-layered structure, and has an inner lining made of a fluoroplastic material and a reinforcing layer.

During operation of the conventional magnetically driven pump, a chemical fluid is introduced into the inlet and guided by the impeller to dissipate heat generated by the inner rotor and then flows out of the outlet. While the inner lining and the reinforcing layer abut against each other to form the double-layered structure of the rear cover, the diameter of the reinforcing layer is smaller than that of the inner lining. As such, if the inner lining is damaged, chemical fluid may easily leak through the crack of the inner lining into a gap between the inner lining and the reinforcing layer, and then flow toward the outer rotor along a periphery of the reinforced layer, thereby corroding the motor device.

SUMMARY

Therefore, an object of the disclosure is to provide a canned motor device that can alleviate the drawback of the prior art.

According to the disclosure, a canned motor device includes a base unit, a positioning seat, a motor unit, a rear cover, an impeller, a front cover, a first sealing element, and a second sealing element. The base unit includes a side cover portion and a main plate portion. The main plate portion surrounds an axis, is connected to the side cover portion, and has a first side surface, a second side surface, and an inner surface. The first side surface has a stepped profile in a radial direction transverse to the axis, and includes an inner annular segment, an outer annular segment and a first shoulder segment. The outer annular segment surrounds the inner annular segment, and is closer to the side cover portion than the inner annular segment. The first shoulder interconnects the inner annular segment and the outer annular segment. The second side surface is opposite to the first side surface along the axis and is disposed closer to the side cover portion than the first side surface. The inner surface is disposed between the inner annular segment of the first side surface and the second side surface. The motor unit is mounted in the base unit and includes a casing body, a stator, and a rotor. The casing body includes a tubular main portion, and a flange portion extending radially and outwardly from one end of the tubular main portion and corresponding in position to the inner annular segment. The stator is sleeved on the casing body. The rotor is mounted in the tubular main portion of the casing body and is rotatable about the axis. The rear cover is mounted in the base unit, and includes a main cover portion and a disk portion. The main cover portion is disposed between the tubular main portion and the stator. The disk portion extends radially and outwardly from one end of the main cover portion, and is clamped sealingly between the flange portion of the motor unit and the inner annular segment of the base unit. The impeller is connected to and driven by the motor unit, and extends into the main plate portion of the base unit along the axis. The front cover is positioned on the first side surface of the main plate portion, covers the impeller, and has an end surface. The end surface abuts against the first side surface, has a stepped profile along the radial direction, and includes an inner surrounding segment, an outer surrounding segment, and a second shoulder. The inner surrounding segment abuts against the inner annular segment of the base unit along the axis. The outer surrounding segment surrounds the inner surrounding segment and abuts against the outer annular segment of the base unit. The second shoulder interconnects the inner surrounding segment and the outer surrounding segment, and abuts against the first shoulder. The disk portion and the flange portion are clamped sealingly between the inner annular segment and the inner surrounding segment. The first sealing element is disposed between the main plate portion of the base unit and the disk portion to form an airtight seal between the base unit and the rear cover. The second sealing element is disposed between the outer annular segment and the outer surrounding segment to form an airtight seal between the base unit and the front cover.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
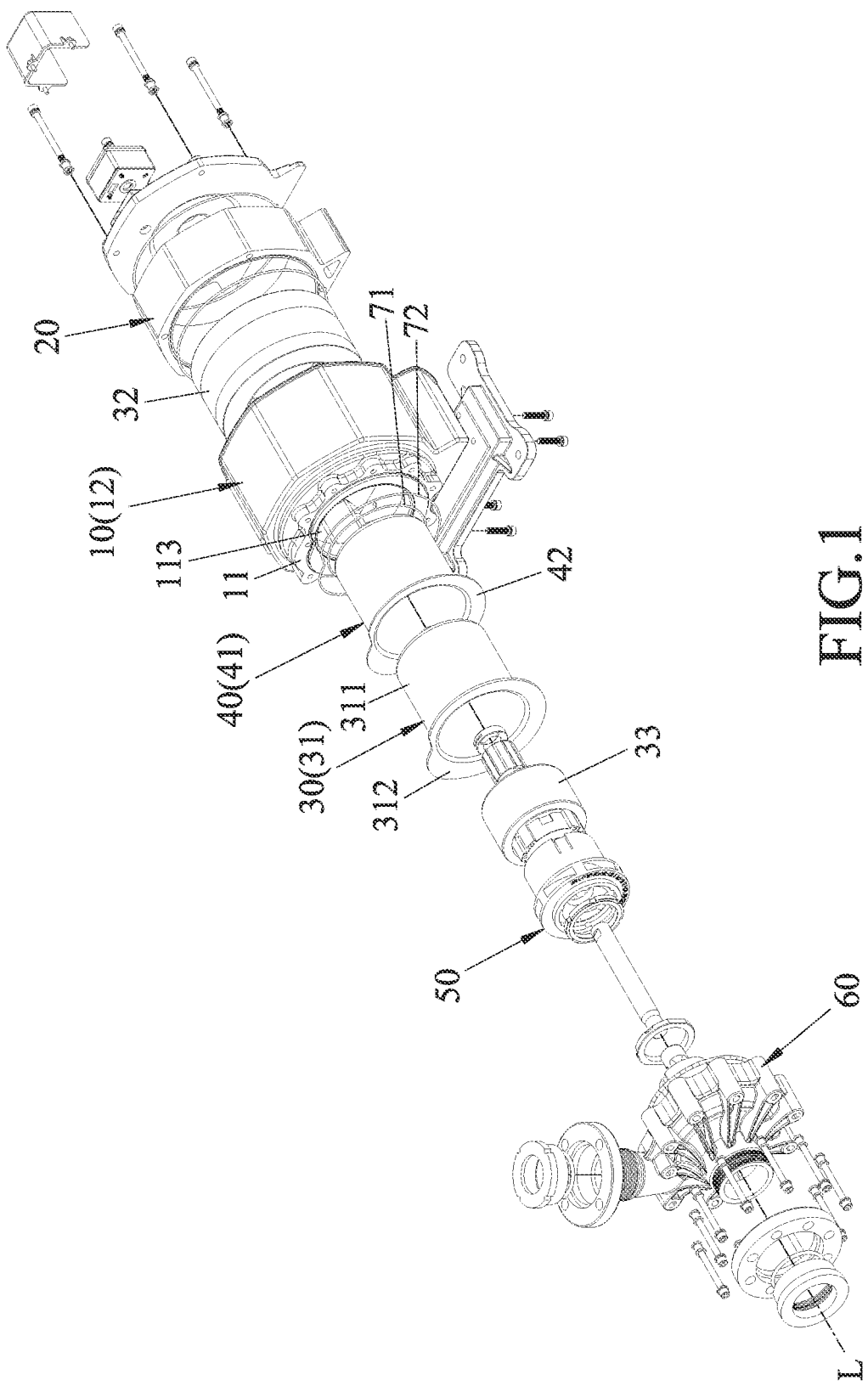
FIG. 1 is a partly exploded perspective view of a canned motor device of an embodiment according to the present disclosure.
Figure 2:
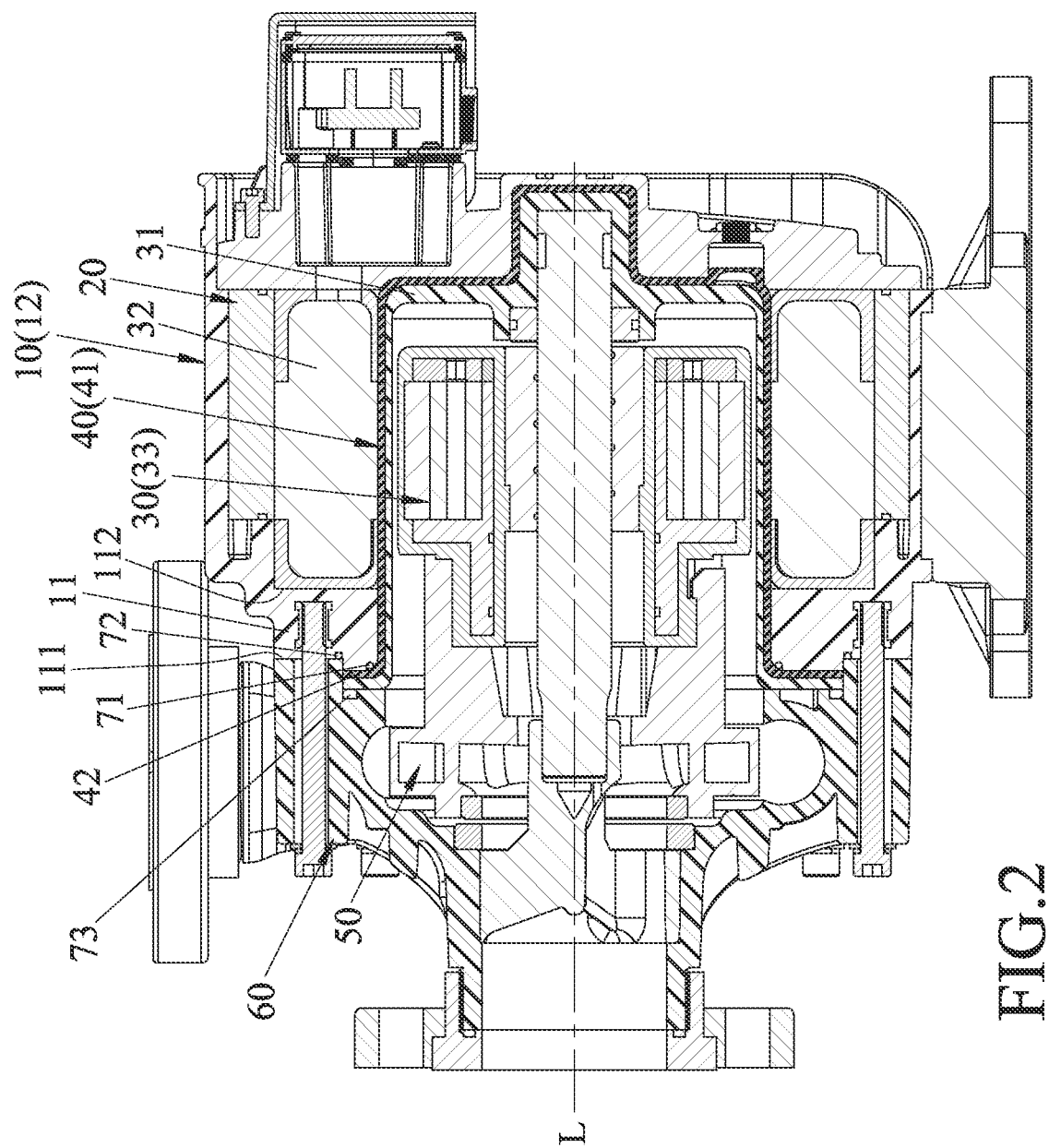
FIG. 2 is a schematic sectional view of the embodiment.
Figure 3:
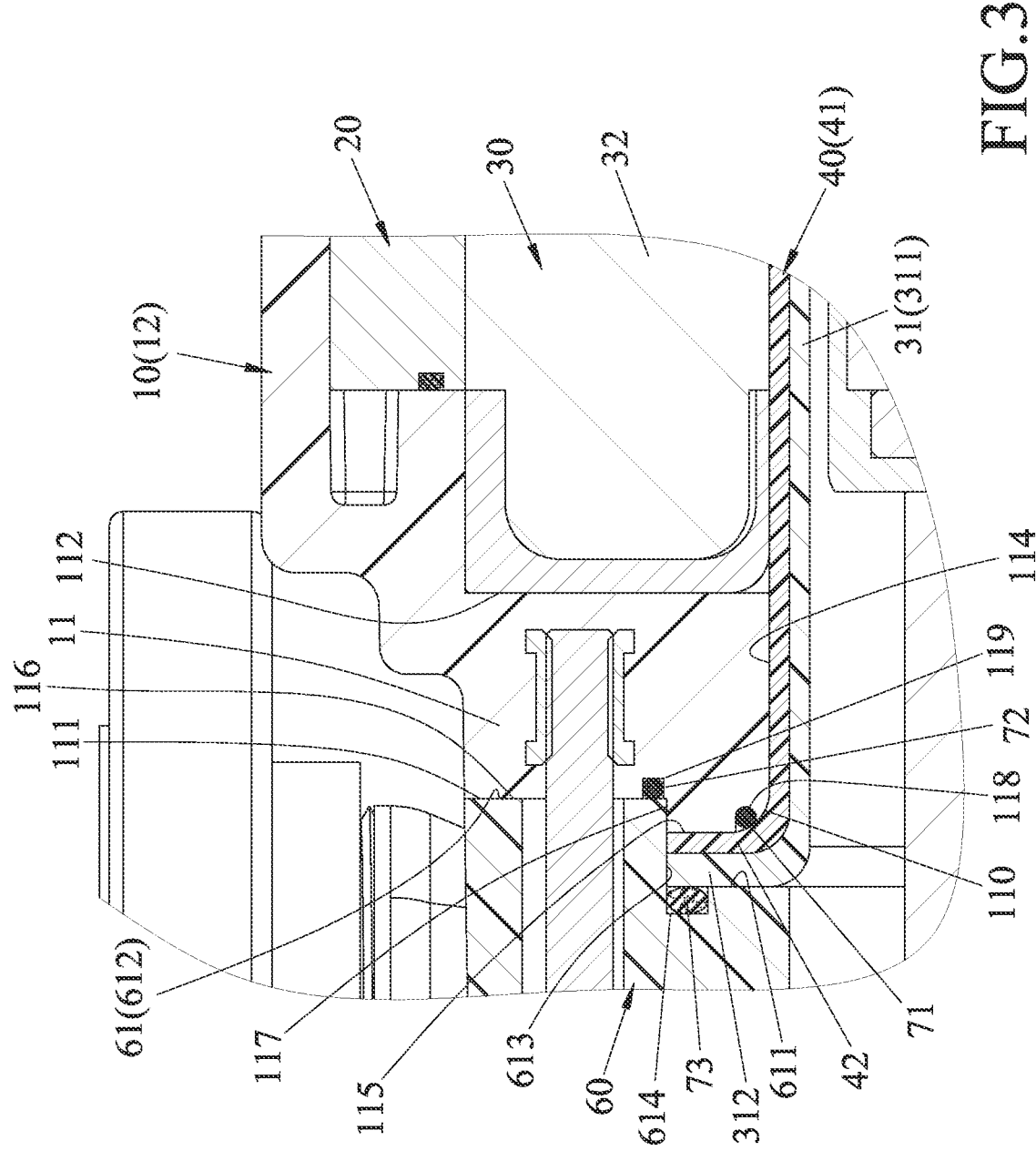
FIG. 3 is a fragmentary sectional view of the embodiment.

Referring to FIGS. 1 to 3, an embodiment of a canned motor device according to the disclosure includes a base unit 10, a positioning seat 20, a motor unit 30, a rear cover 40, an impeller 50, a front cover 60, a first sealing member 71, a second sealing member 72, and a third sealing member 73.

In this embodiment, the base unit 10 is made of plastic material, and can be made of an engineering plastic material that are acid and alkalis resistant such as polypropylene (PP), glass fiber reinforced polypropylene (GFRPP), polyvinylidene fluoride (PVDF), and carbon filled ethylene tetrafluoroethylene (CFRETFE). The base unit 10 includes a main plate portion 11 and a side cover portion 12. The main plate portion 11 surrounds an axis (L), is connected to the side cover portion 12, and has a chamfer surface 110, a first side surface 111, a second side surface 112, and an inner surface 114. The first side surface 111 has a stepped profile in a radial direction transverse to the axis (L), and includes an inner annular segment 115, an outer annular segment 116, and a first shoulder 117. The outer annular segment 116 surrounds the inner annular segment 115, and is closer to the side cover portion 12 than the inner annular segment 115. The first shoulder 117 interconnects the inner annular segment 115 and the outer annular segment 116. The second side surface 112 is opposite to the first side surface 111 along the axis (L) and is disposed closer to the side cover portion 12 than the first side surface 111. The inner surface 114 is disposed between the inner annular segment 115 of the first side surface 111 and has an end connected to the second side surface 112. The chamfer surface 110 is connected between the first side surface 111 and the inner surface 114.

The main plate portion 11 of the base seat 10 defines a first annular groove 118 formed in the inner annular segment 115 and surrounding the axis (L), and a second annular groove 119 formed in the outer annular segment 116 and surrounding the axis (L). Specifically, the first annular groove 118 is adjacent to the inner surface 114 of the main plate portion 11. In this embodiment, the first annular groove 118 is formed in the chamfer surface 110, and the second annular groove 119 is adjacent to the first shoulder 117 of the main plate portion 11.

The positioning seat 20 is made of a metal material, is tubular, and is disposed in the side cover portion 12 of the base unit 10.

The motor unit 30 is mounted in the base unit 10 and the positioning seat 20 and includes a casing body 31, a stator 32, and a rotor 33. The casing body 31 includes a tubular main portion 311, and a flange portion 312 extending radially and outwardly from one end of the tubular main portion 311 and corresponding in position to the inner annular segment 115. The stator 32 is sleeved on the casing body 31. The rotor 33 is mounted in the tubular main portion 311 of the casing body 31 and is rotatable about the axis (L).

The rear cover 40 is mounted in the base unit 10 and includes a main cover portion 41 and a disk portion 42. The main cover portion 41 is disposed between the tubular main portion 311 and the stator 32. The disk portion 42 extends radially and outwardly from one end of the main cover portion 41, and is clamped sealingly between the flange portion 312 of the motor unit 3 and the inner annular segment 115 of the base unit 10.

The impeller 50 is connected to and driven by the motor unit 30, and extends into the main plate portion 11 of the base unit 10 along the axis (L).

The front cover 60 is positioned on the first side surface 111 of the main plate portion 11, covers the impeller 50, defines a third annular groove 614, and has an end surface 61. The end surface 61 abuts against the first side surface 111, has a stepped profile along the radial direction, and includes an inner surrounding segment 611, an outer surrounding segment 612, and a second shoulder 613. The inner surrounding segment 611 abuts against the inner annular segment 115 of the base unit 10 along the axis (L). The outer surrounding segment 612 surrounds the inner surrounding segment 611 and abuts against the outer annular segment 116 of the base unit 10. The second shoulder 613 interconnects the inner surrounding segment 611 and the outer surrounding segment 612, and abuts against the first shoulder 117.

The disk portion 42 and the flange portion 312 are clamped sealingly between the inner annular segment 115 and the inner surrounding segment 611. The flange portion 312 of the casing body 31 and the disk portion 42 of the rear cover 40 abut against the second shoulder 613.

The third annular groove 614 is formed in the inner surrounding segment 611 adjacent to the second shoulder 613, and surrounds the axis (L).

The first sealing element 71 is disposed between the main plate portion 11 of the base unit 10 and the disk portion 42 to form an airtight seal between the base unit 10 and the rear cover 40. In this embodiment, the first sealing element 71 is received within the first annular groove 118.

The second sealing element 72 is disposed between the outer annular segment 116 and the outer surrounding segment 611 to form an airtight seal between the base unit 10 and the front cover 60. In this embodiment, the second sealing element 72 is received within the second annular groove 119 to form an airtight seal between the base unit 10 and the front cover 60.

The third sealing element 73 is received within the third annular groove 614 to form an airtight seal between the flange portion 312 of the motor unit 30 and the front cover 60.

Generally, a chemical fluid is introduced into a space defined within the casing body 31 for dissipating heat generated by the rotor 33. However, when the casing body 31 is damaged or broken, the chemical fluid may leak out of the space and damage the stator 32 of the motor unit 30.

In the following description, the advantages provided by the structures of the embodiment of the canned motor device of the present disclosure are described. As shown in FIG. 2, the front cover 60 is positioned on the main plate portion 11 of the base unit 10 by a plurality of screws. The end surface 61 of the front cover 60 and the first side surface 111 of the main plate portion 11, each of which has a stepped profile, face each other and cooperate with each other to clamp the flange portion 312 of the casing body 31 and the disk portion 42 of the rear cover 40 therebetween. Specifically, the disk portion 42 and the flange portion 312 are clamped sealingly between the inner annular segment 115 and the inner surrounding segment 611. Further, the disk portion 42 and the flange portion 312 abut against the second shoulder 613. Thus, the disk portion 42 and the flange portion 613 are positioned stably and sealingly between the front cover 60 and the casing body 31.

In the case that the chemical fluid leaks out of the space defined by the casing body 31 and flows between the casing body 31 and the rear cover 40, the first sealing element 71 that is mounted between the main plate portion 11 and the disk portion 42 of the rear cover 40, and that is received within the first annular groove 118 serves as the first line of defense to prevent the chemical fluid from leaking out of the rear cover 40 and thus preventing damage to the stator 32. Additionally, the second sealing element 72 that is disposed between the outer annular segment 116 and the outer surrounding segment 611, and that is received within the second annular groove 119 forms an airtight seal between the first side surface 111 of the base unit 10 and outer surrounding segment 611 of the front cover 60. Thus, the second sealing element 72 serves as a second line of defense.

Furthermore, the flange portion 312 of the casing body 31 and the disk portion 42 of the rear cover 40 are clamped sealingly between the inner annular segment 115 of the base unit 10 and the outer surrounding segment 611 of the front cover 60. Thus, the disk portion 42 and the flange portion 313 are positioned stably and sealingly between the base unit 10 and the front cover 60.

The third sealing member 73 is received within the third annular groove 614 to form an airtight seal among the flange portion 312 of the motor unit 30, the front cover 60, and the base unit 10 so as to prevent the chemical fluid from leaking out.

Additionally, the configurations of the first side surface 111 and the end surface 61 each having a stepped profile cooperate to form a plurality of turns such that, when the chemical fluid leaks out of the casing body 31, the flow speed of the chemical fluid can be reduced at each of the turns formed by the first side surface 11 and the end surface 61. In this way, a relatively good leak proof function can be provided and thus the service life of the motor unit 30 can be increased.

To sum up, by virtue of the present disclosure, in the case that the casing body 31 is damaged or broken so that the chemical fluid flows out of the space defined by the casing body 31, the first, second and third sealing elements 71, 72, 73 and the abovementioned structures of the canned motor device of the present disclosure prevent the chemical fluid from leaking out and damaging the stator 32 to thereby lengthen service life of the motor unit 3.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A canned motor device comprising:
    a base unit including a side cover portion and a main plate portion that surrounds an axis, that is connected to said side cover portion, and that has
        a first side surface having a stepped profile in a radial direction transverse to the axis, and including an inner annular segment, an outer annular segment that surrounds said inner annular segment, and that is closer to said side cover portion than said inner annular segment, and a first shoulder that interconnects said inner annular segment and said outer annular segment,
        a second side surface opposite to said first side surface along the axis and disposed closer to said side cover portion than said first side surface, and
        an inner surface disposed between said inner annular segment of said first side surface and said second side surface;
    a motor unit mounted in said base unit and including a casing body that includes a tubular main portion, and a flange portion extending radially and outwardly from one end of said tubular main portion corresponding in position to said inner annular segment, a stator sleeved on said casing body, and a rotor mounted in said tubular main portion of said casing body and rotatable about the axis,
    a rear cover mounted in said base unit and including a main cover portion that is disposed between said tubular main portion and said stator, and a disk portion that extends radially and outwardly from one end of said main cover portion, and that is clamped sealingly between said flange portion of said motor unit and said inner annular segment of said base unit;
    an impeller connected to and driven by said motor unit, and extending into said main plate portion of said base unit along the axis;
    a front cover positioned on said first side surface of said main plate portion, covering said impeller, and having an end surface that abuts against said first side surface, that has a stepped profile along the radial direction, and that includes an inner surrounding segment abutting against said inner annular segment of said base unit along the axis, an outer surrounding segment surrounding said inner surrounding segment and abutting against said outer annular segment of said base unit, and a second shoulder interconnecting said inner surrounding segment and said outer surrounding segment, and abutting against said first shoulder, said disk portion and said flange portion being clamped sealingly between said inner annular segment and said inner surrounding segment;
    a first sealing element disposed between said main plate portion of said base unit and said disk portion to form an airtight seal between said base unit and said rear cover; and
    a second sealing element disposed between said outer annular segment and said outer surrounding segment to form an airtight seal between said base unit and said front cover.

2. The canned motor device as claimed in claim 1, wherein said main plate portion of said base seat defines a first annular groove formed in said inner annular segment and surrounding the axis, said first sealing element being received within said first annular groove to form an airtight seal between said base unit and said rear cover.

3. The canned motor device as claimed in claim 2, wherein said first annular groove is adjacent to said inner surface of said main plate portion.

4. The canned motor device as claimed in claim 3, wherein said main plate portion further has a chamfer surface between said first side surface and said inner surface, said first annular groove being formed in said chamfer surface.

5. The canned motor device as claimed in claim 4, wherein said main plate portion of said base seat defines a second annular groove formed in said outer annular segment and surrounding the axis, said second sealing element being received within said second annular groove to form an airtight seal between said base unit and said front cover.

6. The canned motor device as claimed in claim 5, wherein said second annular groove is formed adjacent to said first shoulder of said main plate portion.

7. The canned motor device as claimed in claim 6, further comprising a third sealing element, wherein said front cover defines a third annular groove formed in said inner surrounding segment and surrounding the axis, said third sealing element being received within said third annular groove to form an airtight seal between said flange portion of said motor unit and said front cover.

8. The canned motor device as claimed in claim 7, wherein said third annular groove is adjacent to said second shoulder.

9. The canned motor device as claimed in claim 1, wherein said flange portion of said casing body of said motor unit and said disk portion of said rear cover abut against said second shoulder.

* * * * *